June 14, 1960 C. A. BIRCH-FIELD 2,941,030
COLOR TELEVISION APPARATUS
Filed Dec. 17, 1954
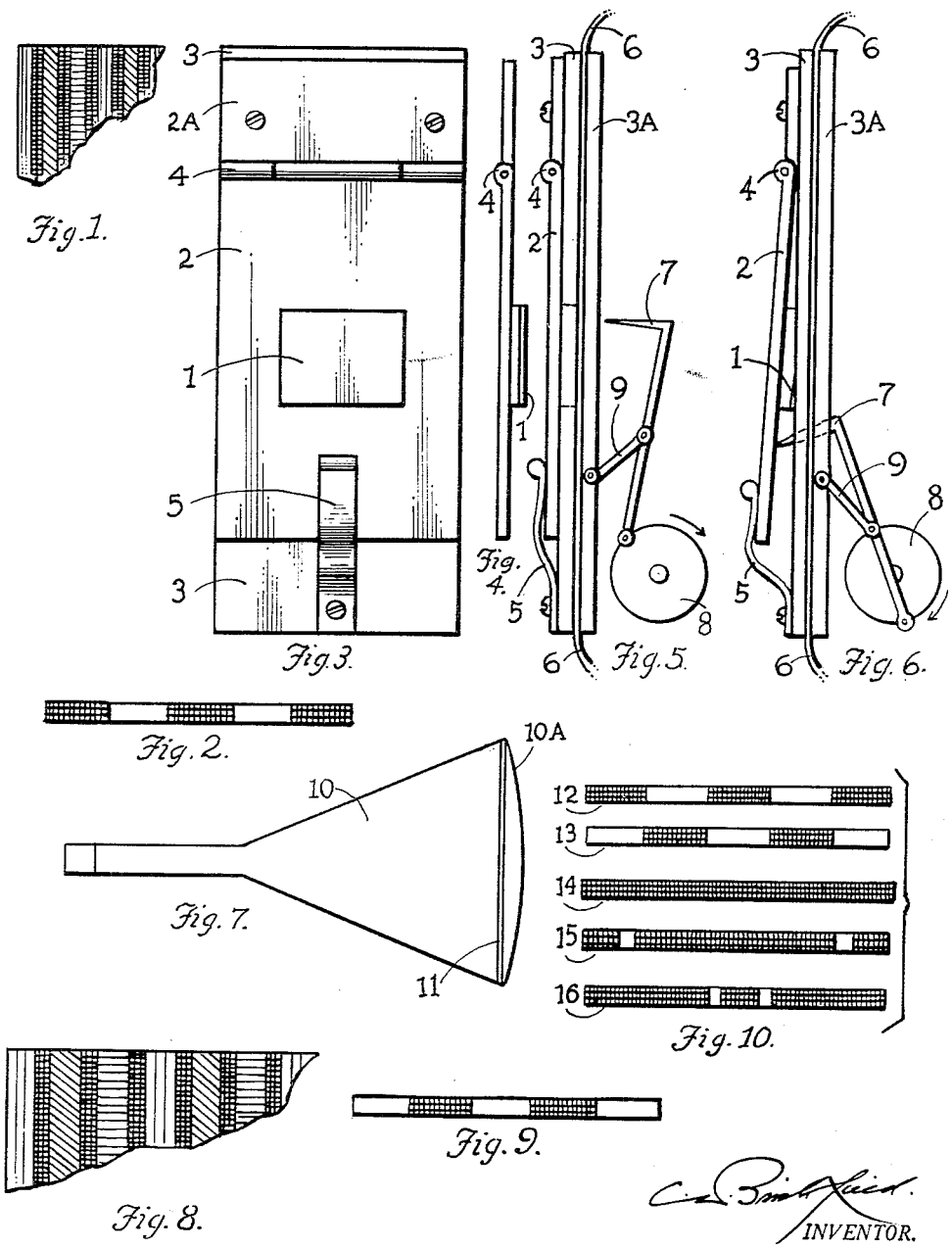

United States Patent Office 2,941,030
Patented June 14, 1960

2,941,030
COLOR TELEVISION APPARATUS

Charles A. Birch-Field, 1621 Shepard Ave., Hamden, Conn.

Filed Dec. 17, 1954, Ser. No. 475,929

2 Claims. (Cl. 178—5.2)

My invention relates to the production, transmission, reception and reproduction of light patterns, pictures and the like, in color, by television, and enjoys the distinction of utilizing transmitting and receiving equipment now in use with a minimum of additions or alterations.

Embodiments of components of my invention are illustrated, in diagram form, in the drawing wherein:

Figure 1 is an enlarged section of the tricolor filter used in photographing subjects, showing the color lines in sequence and the inactive lines between the color lines.

Figure 2 is the register mark imposed upon the filter, showing the transparent and black or opaque sections.

Figure 3 is a front view of the movable member 2, on which the filter 1 is mounted, the movable portion of member 2 connected with its stationary portion 2A by the hinge 4, the portion 2A being fastened to the film track 3 of a conventional motion picture camera. Hinge 4 allows the movable member to move the filter 1 into and out of contact with motion picture film in the said film track, said film being shown as 6 in Figure 5.

Figure 4 is a side view of member 2, showing filter 1 mounted upon ledges to permit filter 1 to pass into and out of the exposure opening of film track 3.

Figure 5 is a side view of filter mounting 2 attached to film track 3 by 2A, with filter 1 in contact with film 6, maintained in such contact during exposures by pressure of spring 5 upon member 2. In both Figure 5 and Figure 6 components of a conventional motion picture camera mechanism for moving the film 6 downward between exposures are shown as 7, 8, and 9. Rotation of member 8, together with motion of link 9, cause claw 7 to engage perforations in film 6, and pull down the said film between exposures, claw 7 being removed from perforations at bottom of movement, and returned free from film to top of movement during exposures by action of 8 and 9.

Figure 6 shows claw 7 passing through the perforations of film 6, and pressing against filter mount member 2, moving it away from film gate 3, and thereby removing filter 1 from contact with film 6, during the movement of film 6 in the period between exposures. At bottom of movement when claw 7 is withdrawn from film perforations, and therefore from contact with filter mount member 2, filter 1 is returned to contact with film 6, by the pressure of spring 5 upon member 2.

Figure 7 shows a conventional electronic viewing tube 10, with a color phosphor viewing screen 11 substituted in place of the conventional monochromatic phosphor viewing screen, with a transparent glass face plate shown at 10A.

Figure 8 shows an enlarged section of the color phosphor viewing screen 11 of Figure 7, showing the color phosphor lines in sequence and the inactive lines between the color phosphor lines.

Figure 9 shows the register mark imposed upon the color phosphor viewing screen, with transparent and opaque sections.

Figure 10 repeats in enlarged form the register marks on film image at 12; the register mark on viewing screen at 13; and, in addition, the appearance of the combination of 12 and 13, when the lines of the image on viewing screen are in proper registration with the lines of the viewing screen is shown at 14; the appearance of the combination of 12 and 13 when the lines of the image on the viewing screen are wider than the lines of the viewing screen is shown at 15; and the appearance of the combination of 12 and 13 when the lines of the image on the viewing screen are narrower than the lines of the viewing screen is shown at 16.

As your petitioner makes no claims for the conventional transmitting and receiving apparatus used in his invention, no illustration of such apparatus is shown in the drawing.

While the components shown in the drawing and covered in the claims may seem to perform separate and distinct functions, they are, each and every one, vital parts of the system, and all of them must be used in coordination to assure the proper functioning of the invention, so they must be considered, not as separate inventions, but, instead, as essential components of one invention.

In the separation of the primary color components of a subject, my invention uses an adaptation of the composite color filter proposed for color photography by Professor Joly of Dublin more than fifty years ago, which filter consists of a consecutive series of vertical, transparent lines in the primary colors red, green and blue, repeated in that sequence across the entire area of the filter, with the color lines abutting upon each other.

In my invention the Joly filter is modified by the interposition of inactive black or opaque lines between all of the color lines.

This use by my invention of the inactive lines between the color lines of the color filter is for the purpose of minimizing the effect, sometimes termed "aperture distortion" in the scanning of an image on the photosensitive cathode of the "pick up" tube of a television camera, which effect produces a widening of a signal representing a picture element, caused by the gradual passage of the scanning spot across the picture element. The use of the inactive lines between the color lines reduces the leading and trailing edges of the widened signal, in an amount determined by the proportional width of the inactive lines and the color lines.

The use of the Joly filter, without the interposition of the inactive lines of my invention, will result in such an overlapping of the color lines signals that the desired color separation will be destroyed.

In the production of material for transmission in color television, with my invention the subject is photographed on panchromatic black and white film through the aforesaid color filter in close contact with the film, creating three linear images of the subject upon the film, each of the three linear images representing in black and white details and tonalities, the color details and tonalities of one of the three primary color components of the subject thus photographed.

For proper results the color filter and panchromatic film must be in very close contact during exposures. In making motion pictures the film is moved between exposures, and if very close contact between filter and film is maintained during such movement, harmful abrasive effects upon filter or film, or both, will occur.

To eliminate such harmful effects, my invention includes a device which, while maintaining close contact between filter and film during exposures, separates the filter and film during the periods of movement of the film between exposures, the device being actuated by the pull down mechanism of the camera, which may be of conventional design and operation.

In the use of panchromatic film in the production of material for television transmission the high sensitivity of the film makes possible the production of satisfactory material under normal lighting conditions, whereas, with systems using the projection of color images upon the photosensitive cathode of the pick up tube of the television camera, the lighting requirements are greatly increased, in some cases as much as ten to one over the lighting requirements for black and white transmissions.

Moreover, when the black and white composite images of my invention are projected upon the photosensitive cathode of a conventional television camera, the emission of photoelectrons from the aforesaid photosensitive cathode is uniform for all color components of the same intensity, as the images are projected with light of one color, whereas when a color image is projected upon the aforesaid photosensitive cathode, the amounts of photoelectron emission vary widely with various colors of the same intensity, in some cases as much as one hundred to one.

With my invention the signals produced by the black and white images are transmitted and received with transmitting and receiving equipment now in general use, without additions or alterations.

The subjects represented by these signals can be received and reproduced in black and white by all present receiving sets without alterations or addition, and the subjects can be received and reproduced in color by all present receiving sets without alterations or additions, except the substitution of a color phosphor viewing tube in place of the monochromatic phosphor viewing tube.

This color phosphor viewing tube consists of a conventional viewing tube, with the substitution of a linear color phosphor screen in place of the monochromatic phosphor screen.

The aforesaid color phosphor screen consists of a flat transparent plate upon which lines of color phosphor are deposited in the same design as the design of the camera color filter heretofore described, with the same number of lines, with the width of the lines being in proportion to the width of the screen, and of a width and distance apart smaller than can be resolved visually.

As in the design of the camera filter, inactive lines are interposed between all of the color phosphor lines for the same purpose, that is, to minimize the adverse effects of "aperture distortion" due to the gradual passage of the scanning spot across the color lines.

The aforesaid color phosphor lines are composed of materials that respectively emit primary red, green and blue light when subjected to the impact of the scanning beam as activated by the signals.

Obviously, when the lines of the image created on the viewing screen by the action of the scanning beam are properly registered with the color phosphor lines of the viewing screen, the image of the subject transmitted will be reproduced in full color.

To make possible this registration my invention includes a device consisting of a narrow opaque bar imposed upon the bottom edge of the camera filter, with transparent sections, and, at the bottom edge of the color phosphor screen, opaque areas of a size, shape and position to fit accurately in the transparent sections of the aforesaid bar on the camera filter as represented in the image projected upon the screen, when the lines of the said image are of the proper width and in proper registration with the color phosphor lines of the screen.

The horizontal width of the said image, and therefore the width of the lines of the image, are controlled by the adjustment of the amplitude of the horizontal deflection circuit of the receiving set. With too high an amplitude the lines of the image will be wider than the lines of the screen; with too low an amplitude the lines of the image will be narrower than the lines of the screen. With amplitude properly adjusted the lines of the image will be of the same width as the lines of the screen.

In my invention my use of the Joly principles is entirely different from that proposed by others in which a Joly type filter is positioned before the photosensitive cathode within the pickup tube of a television camera, and a Joly type filter is positioned before a monochromatic phosphor screen within an electronic viewing tube, which use is inoperative in both cases because, in the case of the pickup tube it is impossible to confine the light rays from a point on a subject to a required specific area on the photosensitive cathode, and in the case of the viewing tube it is impossible to confine the light rays divergent from a point on an image on the phosphor screen to a required specific color line of the filter, resulting in both cases to a spreading over undesired areas with a mixture of undesired color elements that will completely destroy the required color separation.

Such adverse effects are absent in the operation of my invention.

Having thus described and illustrated my invention, what I claim as new and desire to secure by Letters Patent is:

1. In a color television system apparatus for the production of motion pictures for transmission consisting of a compound tricolor filter mounted upon a movable member, said movable member hinged to a stationary member allowing the movement of said movable member in such a manner as to bring the said filter into and out of contact with motion picture film in a conventional motion picture camera, with a spring maintaining said filter in contact with said film during exposures, and means for moving the said filter away from contact with said film during the periods of movement of the said film between exposures, said movement made simultaneously with the movement of the film by the pressure of the claws of the pull down mechanism of the camera against the aforesaid movable member.

2. In a color television system apparatus for registering the elements of an image produced upon a viewing screen with their conjugate areas on the screen, said apparatus consisting of two parts working in cooperation with each other, one part functioning at the transmitter the other functioning at the receiver;

The part at the transmitter consisting of a color filter with a register mark imposed upon it, said register mark consisting of a narrow bar with clear and transparent sections, said register mark being automatically copied upon all images of a subject projected through said filter, and included in all television signals produced by the scanning of said images in a television camera;

The second part of the apparatus consisting of a color phosphor linear viewing screen in a television viewing tube, with a register mark imposed upon the said screen, consisting of a narrow bar with clear and opaque sections of a size, shape and position that the opaque sections will precisely fit in the clear sections of the register mark included in all images produced upon the said viewing screen, when the elements of the said images are in register with their conjugate areas of the said viewing screen.

References Cited in the file of this patent

UNITED STATES PATENTS

| | | |
|---|---|---|
| 2,110,260 | Burgess et al. | Mar. 8, 1938 |
| 2,296,908 | Crosby | Sept. 29, 1942 |
| 2,607,845 | Clark | Aug. 19, 1952 |
| 2,736,764 | Bingley | Feb. 28, 1956 |
| 2,738,379 | James | Mar. 13, 1956 |
| 2,778,971 | Sunstein | Jan. 22, 1957 |
| 2,820,090 | Mountain | Jan. 14, 1958 |
| 2,842,697 | Bingley | July 8, 1958 |
| 2,862,130 | Sadowsky | Nov. 25, 1958 |